United States Patent
Kou et al.

(10) Patent No.: US 9,381,481 B2
(45) Date of Patent: Jul. 5, 2016

(54) POLYETHYLENE IMINE BASED DENDRITIC DISPERSANT

(75) Inventors: Huiguang Kou, Basel (CH); Haiyang Yu, Shanghai (CN); Yanfei Liu, Shanghai (CN); Weiqiu Hu, Shanghai (CN)

(73) Assignee: BASF SE, Ludwigshafen (DE)

( * ) Notice: Subject to any disclaimer, the term of this patent is extended or adjusted under 35 U.S.C. 154(b) by 498 days.

(21) Appl. No.: 12/442,142

(22) PCT Filed: Sep. 17, 2007

(86) PCT No.: PCT/EP2007/059766
§ 371 (c)(1),
(2), (4) Date: Oct. 21, 2009

(87) PCT Pub. No.: WO2008/037612
PCT Pub. Date: Apr. 3, 2008

(65) Prior Publication Data
US 2010/0113709 A1     May 6, 2010

(30) Foreign Application Priority Data

Sep. 27, 2006 (EP) ..................... 06121309

(51) Int. Cl.
| | |
|---|---|
| *B01F 17/00* | (2006.01) |
| *B01F 17/52* | (2006.01) |
| *C08G 73/02* | (2006.01) |
| *C07C 69/02* | (2006.01) |
| *C08G 83/00* | (2006.01) |
| *C09D 7/02* | (2006.01) |
| *B01J 13/00* | (2006.01) |
| *C09B 67/46* | (2006.01) |
| *C09C 3/08* | (2006.01) |
| *C09D 17/00* | (2006.01) |

(52) U.S. Cl.
CPC ........... *B01F 17/005* (2013.01); *B01J 13/0034* (2013.01); *C09B 67/0085* (2013.01); *C09C 3/08* (2013.01); *C09D 7/02* (2013.01)

(58) Field of Classification Search
CPC ...... B01F 17/005; B01J 13/0034; C09D 7/02; C09C 3/08; C09B 67/0085
USPC ............ 516/203; 525/450, 540, 901; 526/910
See application file for complete search history.

(56) References Cited

U.S. PATENT DOCUMENTS

| | | | | |
|---|---|---|---|---|
| 3,669,939 A | * | 6/1972 | Baker et al. ................... | 528/361 |
| 6,197,877 B1 | * | 3/2001 | Thetford et al. .............. | 524/599 |
| 6,395,804 B1 | | 5/2002 | Rao et al. | |
| 6,444,758 B2 | | 9/2002 | McNamara et al. | |
| 6,518,370 B2 | | 2/2003 | Abuelyaman et al. | |
| 6,583,213 B1 | | 6/2003 | Fawkes et al. | |
| 6,617,397 B2 | * | 9/2003 | McNamara et al. .......... | 525/302 |
| 6,649,705 B2 | * | 11/2003 | Ramesh ........................ | 525/437 |
| 6,787,600 B1 | | 9/2004 | Thetford et al. | |
| 6,933,352 B2 | | 8/2005 | Tsuchida et al. | |
| 7,220,307 B2 | * | 5/2007 | Kano et al. ................... | 106/476 |
| 7,361,692 B2 | * | 4/2008 | Thetford ........................ | 516/27 |
| 8,344,074 B2 | * | 1/2013 | Kou ....................... | B01F 17/005 |
| | | | | 524/514 |
| 2002/0169251 A1 | | 11/2002 | He | |
| 2004/0112250 A1 | | 6/2004 | Thetford | |
| 2008/0097044 A1 | | 4/2008 | Bhattacharjee et al. | |
| 2010/0174046 A1 | * | 7/2010 | Liu et al. ....................... | 528/332 |
| 2014/0012036 A1 | * | 1/2014 | Omeis ................... | C09B 67/009 |
| | | | | 560/158 |

FOREIGN PATENT DOCUMENTS

| | | |
|---|---|---|
| JP | 2003-509205 | 3/2003 |
| JP | 2004-051982 | 2/2004 |
| WO | 9421368 | 9/1994 |
| WO | WO 99/00440 A * | 1/1999 |
| WO | 9955763 | 11/1999 |

(Continued)

OTHER PUBLICATIONS

O'Neil, Maryadele J. et al. (©2006, 2010), The Merck Index-An Encyclopedia of Chemicals, Drugs, and Biologicals (14th Ed.—Vers 14.6), Merck Sharp & Dohme Corp., Whitehouse Station, NJ (Knovel Date: Dec. 1, 2007), Entries: Dimethylolpropionic Acid & Butyric Acid, @ http://knovel.com/web/portal/browse/display?_EXT_KNOVEL_DISPLAY_bookid=1863&VerticalID=0.*
John L. Schultz and Edward S. Wilks, "Structural Representation of Polymers", pp. 78-106, Encyclopedia of Polymer Science and Technology, vol. 8, Online ISBN: 9780471440260, (Published Online: Nov. 27, 2002), online @ http://onlinelibrary.wiley.com/mrw/advanced/search?doi=10.1002/0471440264 (Downloaded Jul. 27, 2012).*
English language machine-generated translation for JP2004-051982 (11 pages); 2004.

*Primary Examiner* — Daniel S Metzmaier
(74) *Attorney, Agent, or Firm* — Marshall, Gerstein & Borun LLP

(57) ABSTRACT

The present disclosure relates to a liquid dispersant of the formula I

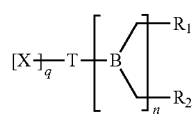

wherein
T is selected from a polyethylene imine (PEI) or modified PEI moiety, polyvinylamine (PVA) or modified PVA, or polyallylamine (PAA) or modified PAA;
B is a branched monomer;
$R_1$ and $R_2$ independently of one another are hydrophobic groups;
X is B with —OH terminal group, or $R_1$ or $R_2$,
q is a number between 5-2000, with the proviso that q is less than the sum of all amine groups of PEI, PVA, PAA; and
n is a number of 1-6.

9 Claims, No Drawings

(56) References Cited

FOREIGN PATENT DOCUMENTS

| WO | 0024503 | 5/2000 |
| WO | 0158987 | 8/2001 |
| WO | 02072639 | 9/2002 |
| WO | 02085507 | 10/2002 |
| WO | 2006047431 | 5/2006 |

* cited by examiner

POLYETHYLENE IMINE BASED DENDRITIC DISPERSANT

The invention relates to a liquid dispersant based on polar polyamines characterized by a "dendritic" structure.

WO94/21368 describes a dispersant comprising a polyethylene imine residue carrying polyester chains derived from a caprolactone and at least one other specified lactone or hydroxycarboxylic acid.

U.S. Pat. No. 6,583,213 or WO99/55763 (Avecia) describes an amine dispersant with polyester chains attached to an amino or imino group of the amine via an ethylenically unsaturated end group of the polyester. It describes an amine dispersant containing one or more amino and/or imino groups, a poly(oxy-C1-6-alkylene carbonyl) chain (POAC chain) obtainable from two or more different linear hydroxycarboxylic acids or lactones thereof and a residue of an ethylenically unsaturated group wherein the amino and/or imino groups are attached via the ethylenically unsaturated group.

The POAC chain may be made from 2-hydroxyethylacrylate, $\epsilon$-caprolactone and delta-valerolactone and the amine and/or imino groups may be provided by polyethylene imine. A polyester entity made from a monocarboxylic acid having at least two hydroxyl groups attached to the amino or imino group of the amine dispersant is not disclosed.

The above referenced publications claim the synthesis of a liquid polyethylene imine (PEI) based pigment dispersant by copolymerization of two or three different linear monomers. The backbone is PEI, and the grafting chain is a mixture-polyester, which is obtained by copolymerization of two or three different linear monomers, such as lactones, alkyl substituted lactones, and hydroxycarboxylic acids. Afterwards, these polyester chains are grafted onto PEI through both neutralization (forming salt bonds) and amidification (forming amide bonds) reactions between acid and amine groups.

Other Patent-Publications e.g. U.S. Pat. No. 6,395,804B1, U.S. Pat. No. 6,518,370B2 and U.S. Pat. No. 6,933,352B2 describe a dendritic dispersant based on a water-soluble dendritic polymer grafted with some hydrophobic groups. The hydrophobic groups were used as anchoring groups. Whereas the water-soluble dendritic polymer interacts with the water-soluble resin phase and builds up a steric environment to stabilize pigment dispersion. This kind of dispersants is not PEI-based, and used in water-based applications.

It has been found that an improved dispersant can be obtained by providing a polar poly-amine based dendritic dispersant.

The inventive products possess good storage stability, improved compatibility, and show lower viscosity of pigment concentrates, high gloss, less yellowing, and especially perfect dispersion effects for phthalocyanine pigments. In conclusion, generally the product of this invention provides a superior performance in alkyd, CAB, TPA, etc, paint system, compared to the prior art.

Thus, the invention relates to a dispersant of the formula I

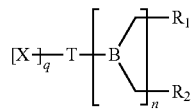

wherein
T is selected from a polyethylene imine (PEI) or modified PEI moiety, polyvinylamine (PVA) or modified PVA, or polyallylamine (PAA) or modified PAA.

B is a branched monomer selected from a monofunctional carboxylic acid moiety having at least two hydroxyl groups or a monofunctional carboxylic acid moiety having at least two hydroxyl groups wherein one or more of the hydroxyl groups are hydroxyalkyl substituted, $R_1$ and $R_2$ independently of one another are hydrophobic groups selected from a saturated or unsaturated fatty acid moiety with 3-24 carbon atoms, a monofunctional carboxylic acid moiety or a polymer moiety containing $C_3$-$C_{24}$ alkyl (hydroxyl)carboxylic acid moieties with MW ranges from 100 to 10,000 g/mol, X is B with —OH terminal group, or $R_1$ or $R_2$, q is a number between 5-2000, with the proviso that q is less than the sum of all amine groups of PEI, PVA, PAA.

n is a number of 1-6.

DEFINITIONS

The term modified PEI, modified PVA, and modified PAA is a group of formula II or III $$\text{PEI, PVA or PAA} \{-Y-\}_m \qquad \text{II}$$

or $$\{-A-\}_p \text{PEI, PVA or PAA} \qquad \text{III}$$

wherein
Y is an extend monomer selected from a lactone, alkyl substituted lactone or a hydroxy carboxylic acid,
A is a side chain monomer selected from a monofunctional carboxylic acid containing 1-10 carbon atoms,
m is a number of 1-40,
p is a number of 1-1000, with the proviso that p is less than the sum of primary and secondary amine groups of the backbone PEI, PVA or PAA.

The term lactone refers to a cyclic ester produced by intramolecular condensation of a hydroxy acid with the elimination of water. It is preferably $\epsilon$-caprolactone or valerolactone.

Alkyl substituted lactones are $C_{1-6}$ alkyl lactones, preferably methylated caprolactones such as 4-methylcaprolactone, 3,5,5-trimethylcaprolactone, and 3,3,5-trimethylcaprolactone, 3-alkylvalerolactone and the like.

"Y" in Formula II may be a hydroxycarboxylic acid selected from glycolic acid, malic acid, lactic acid, hydroxyacrylic acid, alpha-hydroxybutyric acid, and the like; or a hydroxy-carboxylic acid derived from a lactone. Preferably Y is $\epsilon$-caprolactone, valerolactone or an alkyl substituted lactone, more preferably $\epsilon$-caprolactone or valerolactone.

The molecular weight of the extend moiety Y of preferably is in the range of 500-4,000 g/mol.

"A" in Formula III may be a monofunctional carboxylic acid selected from acetic acid, propionic acid, n-butyric acid, and the like.

"B" in formula I may be a monofunctional carboxylic acid having at least two hydroxyl groups selected from 2,2-bis (hydroxymethyl)propionic acid, $\alpha,\alpha$-bis(hydroxymethyl) butyric acid, $\alpha,\alpha,\alpha$-tris(hydroxymethyl)acetic acid, $\alpha,\alpha$-bis-(hydroxymethyl) valeric acid, $\alpha,\alpha$-bis-(hydroxy) propionic acid, 3,5-dihydroxybenzoic acid, and the like.

More preferably B is 2,2-bis(hydroxymethyl)propionic acid, or $\alpha,\alpha$-bis(hydroxymethyl) butyric acid.

"$R_1$ and $R_2$" in formula I are preferably the same residues (R) and may be a monofunctional carboxylic acid selected from acetic acid, butyric acid, hexanoic acid, lauric acid, stearic acid, and the like; or hydroxystearic acid, ricinoleic acid, and various fatty acids.

"$R_1$ and $R_2$" in formula I may also be a polymer moiety containing alkyl(hydroxy)carboxylic acid moieties. Preferred is polyhydroxystearic acid (PHSA), with acid numbers of PHSA preferably between 10 and 200 mgKOH/g or acid terminated polyethers with molecular weight ranges from 200 to 5,000 g/mol.

More preferably "$R_1$ and $R_2$" are selected from lauric acid, stearic acid, polyhydroxystearic acid with an acid number of 20-200 mgKOH/g.

Preferences

In formula I q is preferably a number between 5-500 and n is preferably a number of 2-4.

In formula I, X is hydrophilic and is B with —OH termini if the mole ratio of R to B is less than $k''(k-1)/(k''-1)$. Whereas X is hydrophobic and is R if the mole ratio of R and B is above $k''(k-1)/(k''-1)$. "k" is the number of hydroxyl groups for B.

T is preferably polyethylene imine or modified polyethylene imine, more preferably polyethylene imine with MW ranging from 200-100,000 g/mol.

A in formula III is preferably acetic acid, propionic acid or n-butyric acid.

The modified ratio of primary and secondary amine groups for PEI with the side-chain monomers preferably is in the range of 25-75%.

Synthesis

Accessibility of the Starting Materials

PEI raw materials are commercial products from Nippon Shukubai etc. PVA raw materials are commercial products from Mitsubishi Kasei and PAA raw materials are commercial products from Nitto Boseki. Ethyl acetate, 2,2-bis(hydroxymethyl)propionic acid, fatty acids and lactones are commercial products.

Polyhydroxystearic acid can easily be prepared by methods known in the art.

To obtain a liquid form of a PEI-based dispersant, totally different from the "copolymerization" approach in prior arts, this invention focuses on introduction of "dendritic" moieties into the dispersant chemical structure via either convergent or divergent approach.

"Dendritic" moiety means the moieties is synthesized via repeated reactions of branched monomers (containing at least one branch points, i.e. $AB_2$, or $AB_3$ type monomers, such as 2,2-bis(hydroxymethyl)propionic acid, α,α,α-tris(hydroxymethyl)acetic acid).

"Convergent" approach means a growth process which begins from what will become the surface of the dispersant and progresses radially in a molecular direction toward a focal point or core. The arm-dendritic moieties were synthesized via the (trans)esterification between branched monomer and hydrophobic moieties, and/or among branched monomers firstly. The obtained resultant progresses radially toward (modified) PEI in the analogous reaction. Through adjusting the ratio of branched monomer to hydrophobic moieties, the polarity and therefore the compatibility of the dendritic dispersant can be easily optimized.

"Divergent" approach means a molecular growth process which occurs through a consecutive series of geometrically progressive step-wise additions of branches upon branches in a radially outward molecular direction to produce an ordered arrangement of layered branch generation, in which each macromolecule includes a core generation, one or more layers of internal generations, and an outer layer of surface generations, wherein each of the generations includes a single branched juncture. (Trans)esterification between (modified) PEI and branched monomer, and/or among branched monomers firstly, is operated as the step-wise addition of branched monomer into (modified) PEI. Then, hydrophobic moieties were grafted onto above resultant via esterification to adjust the polarity and therefore the compatibility of dendritic dispersant. Under optimized conditions, a liquid-form dispersant possessing of the storage stability, less-yellowing in white pigment formulations, especially good dispersion effect for blue pigment, low viscosity of pigment concentrates, performance of draw-downs and pour-outs in different let down systems is obtained.

Thus, the invention relates to a process for the preparation of polyamine-based dendritic dispersants as represented in formula I by a "convergent" approach, characterized by (trans)esterification of B and R, or B and X to produce a dendritic arm firstly, and then grafting this arm onto core molecule T in sequence.

Or the invention relates to a process for the preparation of polyamine-based dendritic dispersants as represented in formula I by a "divergent" approach, characterized by grafting B onto core molecule T firstly, then more and more B grafted onto the peripheral B of above obtained polymer layer by layer, finally, grafting R onto the above dendritic polymers.

The reaction temperatures range from 100° C. to 200° C., preferably 150° C. to 180° C. under $N_2$ atmosphere.

The products obtained have acid numbers of 5-25 mg KOH/g.

The products obtained are schematically shown below

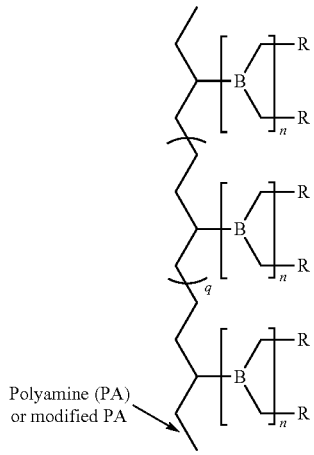

B: is branched monomer R: is hydrophobic group, such as 2,2-bis(hydroxymethyl)proionic acid, such as lauric acid, stearic acid or α,α-bis(hydroxymethyl) butyric acid or polyhydroxystearic acid

EXAMPLES

Synthesis of Intermediate 1-4

Intermediate 1-4 were all prepared by the following process: 2,2-bis-(hydroxylmethyl)-propionic acid (BMPA, from Aldrich, MW 134), ε-caprolactone (CL, MW 114) 100.0 g, and di-butyltin dilaurate (DBTDL) ($5.0*10^{-4}$ w/w) were stirred under nitrogen and heated at 170° C. until solid contents reached 98%. Table 1 lists the results.

TABLE 1

| Intermediate | CL:BMPA w/w | Product properties | |
|---|---|---|---|
| | | Acid number mgKOH/g | Appearance |
| 1 | 1.7 | 150 | Clear liquid |
| 2 | 3.4 | 90 | Clear liquid |
| 3 | 5.1 | 65 | Waxy solid |
| 4 | 6.8 | 50 | Solid |

Intermediate 5-12

Intermediate 5-12 were all prepared by the following process: PEI (polyethylene imine)-EPOMIN® SP-200 (from Nippon Shokubai, MW 10,000), ε-caprolactone (CL) 100.0 g, and dibutyltin dilaurate (DBTDL) (5.0*10-.sup.4 w/w) were stirred under nitrogen and heated in a range of 170° C. for 1.0-30 h until solid contents reached 98%. Table 2 lists the results. In the case of Intermediate 7 and 9, the PEI was also replaced by EPOMIN® SP-018 (PEI, from Nippon Shokubai, MW 1,800). In the case of Intermediate 11 and 12, the PEI was re-placed by polyvinylamine (PVA200, from Mitsubishi Kasei, MW 10,000) and polyallylamine (PAA150, from Nitto Boseki, MW 10,000), respectively.

TABLE 2

| Intermediate | CL:PEI w/w | Product properties | |
|---|---|---|---|
| | | Amine number mgKOH/g | Appearance |
| 5 | 8.8 | 42 | Clear liquid |
| 6 | 26.3 | 14 | Waxy solid |
| 7 | 26.3 | 17 | Solid |
| 8 | 35.1 | 11 | Solid |
| 9 | 35.1 | 14 | Solid |
| 10 | 52.6 | 7.5 | Solid |
| 11 | 26.5 | 0.6 | Solid |
| 12 | 20.0 | 0.8 | Solid |

Intermediate 13

PEI, SP200 20 g and ethyl acetate 30 g were stirred and refluxed in a range of 90° C. until the solid content reached 55%. After removing the residuals under vacuum, the product was obtained as a viscous liquid with an amine number of 650 mg KOH/g.

Intermediate 14

This was prepared comparable to Intermediate 13, but refluxed until the solid content reached 60%. The product was obtained as a viscous liquid with an amine number of 430 mg KOH/g.

Intermediate 15

This was prepared comparable to Intermediate 13, but replaced SP200 by SP018. The product was obtained as a viscous liquid with an amine number of 660 mg KOH/g.

Intermediate 16

This was prepared comparable to Intermediate 13, but replaced SP200 by PAA150. The product was obtained as a waxy solid with an amine number of 360 mg KOH/g.

Intermediate 17

This was prepared comparable to Intermediate 14, but replaced SP200 by PVA200.
The product was obtained as a waxy solid with an amine number of 440 mg KOH/g.

Intermediate 18-20

Intermediate 18-20 were all prepared by the following process: 12-Hydroxystearic acid 100.0 g and DBTDL 0.10 g were stirred under nitrogen and heated in a range of 200° C. for 5-12 h. The by-product water was removed by refluxing with benzene. The products with different acid numbers were obtained according to different reaction times (Table 3).

TABLE 3

| Intermediate | Reaction time h | acid number mgKOH/g | Appearance |
|---|---|---|---|
| 18 | 5.0 | 95.4 | Clear liquid |
| 19 | 9.0 | 48.7 | Clear liquid |
| 20 | 12.0 | 29.6 | Clear liquid |

Examples Via "Convergent" Approach

Example 1

2,2-bis-(hydroxylmethyl)propionic acid (BMPA) 13.4 g and lauric acid 40.0 g were stirred under nitrogen and heated at 180° C. until acid number reduced as 115 mg KOH/g ($1^{st}$ step). Then, EPOMIN® SP-200 (PEI) 12.9 g was added into the above resultant, stirred under nitrogen and heated at 180° C. until acid number reduced as 25.3 mg KOH/g ($2^{nd}$ step). The product was obtained as a waxy solid with an amine number of 180 mg KOH/g.

Example 2-50

Example 2-50 were all prepared in a similar manner as Example 1 except that the amounts of precursors were varied as detailed in Table 4 below. Table 5 lists the results.

TABLE 4

| Ex. | $1^{st}$ step Precursors and its amount | | Acid number in $1^{st}$ step mgKOH/g | $2^{nd}$ step Precursor and its amount |
|---|---|---|---|---|
| 2 | 13.4 g BMPA | 22.8 g Lauric acid | 24.8 | 1.8 g SP200 |
| 3 | 13.4 g BMPA | 22.8 g Lauric acid | 25.1 | 33.5 g Intermediate 8 |
| 4 | 13.4 g BMPA | 22.8. g Lauric acid | 24.9 | 5.5 g Intermediate 14 |
| 5 | 36.2 g Intermed. 1 | 40.0 g Lauric acid | 81.2 | 12.9 g SP200 |
| 6 | 36.2 g Intermed. 1 | 40.0 g Lauric acid | 80.5 | 177.5 g Intermediate 7 |
| 7 | 36.2 g Intermed. 1 | 40.0 g Lauric acid | 79.2 | 17.1. g Intermediate 13 |
| 8 | 36.2 g Intermed. 1 | 22.8 g Lauric acid | 15.5 | 25.4 g Intermediate 6 |

TABLE 4-continued

| Ex. | 1st step Precursors and its amount | | Acid number in 1st step mgKOH/g | 2nd step Precursor and its amount |
|---|---|---|---|---|
| 9 | 59.0 g Intermed. 2 | 40.0 g Lauric acid | 63.3 | 12.9 g SP018 |
| 10 | 59.0 g Intermed. 2 | 40.0 g Lauric acid | 62.7 | 12.9 g SP200 |
| 11 | 59.0 g Intermed. 2 | 40.0 g Lauric acid | 63.6 | 63.7 g Intermediate 5 |
| 12 | 59.0 g Intermed. 2 | 40.0 g Lauric acid | 64 | 177.5 g Intermediate 6 |
| 13 | 59.0 g Intermed. 2 | 40.0 g Lauric acid | 64.3 | 17.1 g Intermediate 15 |
| 14 | 59.0 g Intermed. 2 | 26.7 g Lauric acid | 24.5 | 59.2 g Intermediate 6 |
| 15 | 59.0 g Intermed. 2 | 26.7 g Lauric acid | 23.8 | 5.7 g Intermediate 13 |
| 16 | 59.0 g Intermed. 2 | 22.8 g Lauric acid | 10.5 | 25.4 g Intermediate 6 |
| 17 | 59.0 g Intermed. 2 | 22.8 g Lauric acid | 11.4 | 33.5 g Intermediate 8 |
| 18 | 59.0 g Intermed. 2 | 22.8 g Lauric acid | 11.1 | 5.5 g Intermediate 14 |
| 19 | 59.0 g Intermed. 2 | 22.8 g Lauric acid | 10.9 | 1.8 g SP200 |
| 20 | 59.0 g Intermed. 2 | 22.8 g Lauric acid | 11.3 | 1.8 g SP018 |
| 21 | 59.0 g Intermed. 2 | 21.3 g Lauric acid | 5.8 | 4.2 g Intermediate 5 |
| 22 | 59.0 g Intermed. 2 | 21.3 g Lauric acid | 5.9 | 15.6 g Intermediate 9 |
| 23 | 59.0 g Intermed. 2 | 21.3 g Lauric acid | 5.3 | 23.2 g Intermediate 10 |
| 24 | 59.0 g Intermed. 2 | 21.3 g Lauric acid | 5.7 | 2.6 g Intermediate 14 |
| 25 | 81.8. g Intermed. 3 | 40.0 g Lauric acid | 50.6 | 17.1 g Intermediate 15 |
| 26 | 81.8. g Intermed. 3 | 26.7 g Lauric acid | 16.1 | 21.2 g Intermediate 5 |
| 27 | 81.8. g Intermed. 3 | 22.8 g Lauric acid | 8.9 | 25.4 g Intermediate 7 |
| 28 | 81.8. g Intermed. 3 | 22.8 g Lauric acid | 9.5 | 1.8 g SP 200 |
| 29 | 81.8. g Intermed. 3 | 22.8 g Lauric acid | 9.2 | 5.5 g Intermediate 14 |
| 30 | 104.6 g Intermed. 4 | 40.0 g Lauric acid | 40.6 | 12.9 g SP 018 |
| 31 | 104.6 g Intermed. 4 | 26.7 g Lauric acid | 15.8 | 21.2 g Intermediate 5 |
| 32 | 104.6 g Intermed. 4 | 22.8 g Lauric acid | 7.4 | 5.5 g Intermediate 14 |
| 33 | 13.4 g BMPA | 32.4 g Stearic acid | 24.6 | 33.5 g Intermediate 9 |
| 34 | 59.0 g Intermed. 2 | 32.4 g Stearic acid | 10.1 | 33.5 g Intermediate 8 |
| 35 | 59.0 g Intermed. 2 | 32.4 g Stearic acid | 9.8 | 5.5 g Intermediate 14 |
| 36 | 81.8 g Intermed. 3 | 32.4 g Stearic acid | 8.1 | 25.4 g Intermediate 7 |
| 37 | 36.2 g Intermed. 1 | 67.2 g Intermed. 18 | 9.5 | 25.4 g Intermediate 6 |
| 38 | 59.0 g Intermed. 2 | 67.2 g Intermed. 18 | 7.4 | 33.5 g Intermediate 8 |
| 39 | 59.0 g Intermed. 2 | 131.0 g Intermed. 19 | 5.0 | 5.5 g Intermediate 14 |
| 40 | 81.8 g Intermed. 3 | 37.8 g Intermed. 20 | 13.6 | 1.7 g Intermediate 15 |
| 41 | 36.2 g Intermed. 1 | 22.8 g Lauric acid | 15.5 | 25.4 g Intermediate 6 |
| 42 | 59.0 g Intermed. 2 | 22.8 g Lauric acid | 10.5 | 25.4 g Intermediate 6 |
| 43 | 59.0 g Intermed. 2 | 22.8 g Lauric acid | 10.9 | 1.8 g SP200 |
| 44 | 81.8 g Intermed. 3 | 26.7 g Lauric acid | 16.1 | 21.2 g Intermediate 5 |
| 45 | 59.0 g Intermed. 2 | 22.8 g Lauric acid | 10.9 | 0.6 g PVA200 |
| 46 | 59.0 g Intermed. 2 | 22.8 g Lauric acid | 10.9 | 0.8 g PAA150 |
| 47 | 59.0 g Intermed. 2 | 22.8 g Lauric acid | 10.9 | 16.8 g Intermediate 11 |
| 48 | 59.0 g Intermed. 2 | 22.8 g Lauric acid | 10.9 | 17.0 g Intermediate 12 |
| 49 | 59.0 g Intermed. 2 | 22.8 g Lauric acid | 10.9 | 2.2 g Intermediate 16 |
| 50 | 59.0 g Intermed. 2 | 22.8 g Lauric acid | 10.9 | 1.8 g Intermediate 17 |

TABLE 5

| Example | Acid number mgKOH/g | Amine number mgKOH/g | Appearance |
|---|---|---|---|
| 2 | 5.1 | 46.3 | Clear liquid |
| 3 | 4.5 | 5.5 | Waxy solid |
| 4 | 4.7 | 41.8 | Viscous liquid |
| 5 | 15.2 | 135.3 | Viscous liquid |
| 6 | 14.5 | 11.5 | Solid |
| 7 | 16.3 | 71.5 | Solid |
| 8 | 3.6 | 4.5 | Clear liquid |
| 9 | 11.8 | 115.1 | Waxy solid |
| 10 | 10.7 | 108.4 | Waxy solid |
| 11 | 12.2 | 16.2 | Waxy solid |
| 12 | 11.2 | 8.8 | Waxy solid |
| 13 | 10.9 | 55.3 | Waxy solid |
| 14 | 4.6 | 5.5 | Clear liquid |
| 15 | 5.1 | 23.6 | Clear liquid |
| 16 | 3.5 | 3.6 | Clear liquid |
| 17 | 3.1 | 3.4 | Viscous liquid |
| 18 | 2.8 | 20.5 | Clear liquid |
| 19 | 3.0 | 19.8 | Clear liquid |
| 20 | 3.2 | 21.3 | Clear liquid |
| 21 | 2.0 | 2.6 | Clear liquid |
| 22 | 2.2 | 2.3 | Clear liquid |
| 23 | 2.5 | 1.9 | Waxy solid |
| 24 | 3.0 | 11.4 | Clear liquid |
| 25 | 11.2 | 49.5 | Solid |
| 26 | 4.0 | 6.8 | Waxy solid |
| 27 | 2.9 | 3.5 | Viscous liquid |
| 28 | 3.1 | 17.8 | Clear liquid |
| 29 | 2.9 | 17.1 | Viscous liquid |
| 30 | 7.9 | 79.6 | Solid |
| 31 | 3.5 | 6.2 | Solid |
| 32 | 2.3 | 14.2 | Waxy Solid |
| 33 | 5.5 | 4.5 | Viscous liquid |
| 34 | 3.1 | 3.2 | Viscous liquid |
| 35 | 2.9 | 18.9 | Clear liquid |
| 36 | 2.6 | 3.3 | Viscous liquid |
| 37 | 2.5 | 2.9 | Clear liquid |
| 38 | 2.4 | 3.0 | Clear liquid |
| 39 | 2.3 | 9.5 | Clear liquid |
| 40 | 2.7 | 14.2 | Viscous liquid |
| 41 | 7.8 | 4.6 | Clear liquid |
| 42 | 5.4 | 3.8 | Clear liquid |
| 43 | 5.1 | 22.5 | Clear liquid |
| 44 | 8.0 | 6.9 | Waxy solid |
| 45 | 4.5 | 6.5 | Clear liquid |
| 46 | 5.2 | 5.2 | Clear liquid |
| 47 | 4.6 | 0.3 | Viscous liquid |
| 48 | 5.0 | 0.4 | Viscous liquid |
| 49 | 5.4 | 4.2 | Clear liquid |
| 50 | 4.7 | 4.9 | Clear liquid |

Examples Via "Disvergent" Approach

Example 51

EPOMIN® SP200 (PEI) 12.9 g was stirred under nitrogen and heated at 180° C., and then 2,2-bis-(hydroxylmethyl) propionic acid (BMPA) 13.4 g was added step-wise. The above resultant was cooked at 180° C. until acid number reduced as 6.5 mgKOH/g (1$^{st}$ step). Then, lauric acid 40.0 g was added into the above resultant, stirred under nitrogen and heated at 180° C. until acid number reduced as 5.0 mgKOH/g (2$^{nd}$ step). The product was obtained as a waxy solid with an amine number of 85 mgKOH/g.

Example 52-102

Example 52-102 were all prepared in a similar manner as Example 51 except that the amounts of precursors were varied as detailed in Table 6 below. Table 7 lists the results.

TABLE 6

| Example | 1$^{st}$ step Precursors and its amount | | Acid number of 1$^{st}$ step mgKOH/g | 2$^{nd}$ step Precursor and its amount |
|---|---|---|---|---|
| 52 | SP018 6.5 g | Intermediate 2 59.0 g | 6.7 | Lauric acid 40.0 g |
| 53 | SP018 0.9 g | Intermediate 2 59.0 g | 9.3 | Lauric acid 16.0 g |
| 54 | SP 018 6.5 g | Intermediate 4 104.6 g | 7.6 | Lauric acid 40.0 g |
| 55 | SP200 0.9 g | BMPA 13.4 g | 9.8 | Lauric acid 16.0 g |
| 56 | SP200 6.5 g | Intermediate 1 36.2 g | 6.2 | Lauric acid 40.0 g |
| 57 | SP200 6.5 g | Intermediate 2 59.0 g | 6.5 | Lauric acid 40.0 g |
| 58 | SP200 0.9 g | Intermediate 2 59.0 g | 9.9 | Lauric acid 16.0 g |
| 59 | SP200 0.9 g | Intermediate 2 59.0 g | 9.9 | Lauric acid 12.0 g |
| 60 | SP 200 0.9 g | Intermediate 3 81.8 g | 9.5 | Lauric acid 16.0 g |
| 61 | Intermediate 5 63.7 g | Intermediate 2 59.0 g | 6.6 | Lauric acid 40.0 g |
| 62 | Intermediate 5 4.2 g | Intermediate 2 59.0 g | 10.8 | Lauric acid 14.9 g |
| 63 | Intermediate 5 21.2 g | Intermediate 3 81.8 g | 8.9 | Lauric acid 21.3 g |
| 64 | Intermediate 5 21.2 g | Intermediate 3 81.8 g | 8.9 | Lauric acid 16.0 g |
| 65 | Intermediate 5 21.2 g | Intermediate 4 104.6 g | 8.8 | Lauric acid 21.3 g |
| 66 | Intermediate 6 25.4 g | Intermediate 1 36.2 g | 9.5 | Lauric acid 16.0 g |
| 67 | Intermediate 6 177.5 g | Intermediate 2 59.0 g | 7.1 | Lauric acid 40.0 g |
| 68 | Intermediate 6 59.2 g | Intermediate 2 59.0 g | 8.5 | Lauric acid 21.3 g |
| 69 | Intermediate 6 25.4 g | Intermediate 2 59.0 g | 9.7 | Lauric acid 16.0 g |
| 70 | Intermediate 6 25.4 g | Intermediate 1 36.2 g | 9.5 | Intermediate 18 47.2 g |
| 71 | Intermediate 6 25.4 g | Intermediate 1 36.2 g | 9.5 | Lauric acid 12.0 g |
| 72 | Intermediate 6 25.4 g | Intermediate 2 59.0 g | 9.7 | Lauric acid 16.0 g |
| 73 | Intermediate 6 25.4 g | Intermediate 2 59.0 g | 9.7 | Lauric acid 12.0 g |
| 74 | Intermediate 6 25.4 g | Intermediate 2 59.0 g | 9.7 | Lauric acid 8.0 g |
| 75 | Intermediate 7 177.5 g | Intermediate 1 36.2 g | 6.5 | Lauric acid 40.0 g |
| 76 | Intermediate 7 25.4 g | Intermediate 3 81.8 g | 9.5 | Lauric acid 16.0 g |
| 77 | Intermediate 7 25.4 g | Intermediate 3 81.8 g | 9.7 | Stearic acid 22.7 g |
| 78 | Intermediate 8 33.5 g | BMPA 13.4 g | 9.5 | Lauric acid 16.0 g |
| 79 | Intermediate 8 33.5 g | Intermediate 2 59.0 g | 9.4 | Lauric acid 16.0 g |
| 80 | Intermediate 8 33.5 g | Intermediate 2 59.0 g | 10.4 | Stearic acid 22.7 g |
| 81 | Intermediate 8 33.5 g | Intermediate 2 59.0 g | 8.9 | Intermediate 18 47.2 g |
| 82 | Intermediate 9 15.6 g | Intermediate 2 59.0 g | 10.9 | Lauric acid 15.0 g |

TABLE 6-continued

| Example | 1st step Precursors and its amount | | Acid number of 1st step mgKOH/g | 2nd step Precursor and its amount |
|---|---|---|---|---|
| 83 | Intermediate 9 33.5 g | BMPA 13.4 g | 9.6 | Stearic acid 22.7 g |
| 84 | Intermediate 10 23.2 g | Intermediate 2 59.0 g | 10.3 | Lauric acid 15.0 g |
| 85 | Intermediate 13 17.1 g | Intermediate 1 36.2 g | 7.2 | Lauric acid 40.0 g |
| 86 | Intermediate 13 5.7 g | Intermediate 2 59.0 g | 8.8 | Lauric acid 21.3 g |
| 87 | Intermediate 14 5.5 g | BMPA 13.4 g | 9.9 | Lauric acid 16.0 g |
| 88 | Intermediate 14 5.5 g | Intermediate 2 59.0 g | 10.1 | Lauric acid 16.0 g |
| 89 | Intermediate 14 2.6 g | Intermediate 2 59.0 g | 10.7 | Lauric acid 15.0 g |
| 90 | Intermediate 14 5.5 g | Intermediate 3 81.8 g | 10.2 | Lauric acid 16.0 g |
| 91 | Intermediate 14 5.5 g | Intermediate 4 104.6 g | 9.4 | Lauric acid 16.0 g |
| 92 | Intermediate 14 5.5 g | Intermediate 2 59.0 g | 10.1 | Stearic acid 22.7 g |
| 93 | Intermediate 14 5.5 g | Intermediate 2 59.0 g | 10.0 | Intermediate 19 91.7 g |
| 94 | Intermediate 15 17.1 g | Intermediate 2 59.0 g | 7.3 | Lauric acid 40.0 g |
| 95 | Intermediate 15 17.1 g | Intermediate 3 81.8 g | 7.6 | Lauric acid 40.0 g |
| 96 | Intermediate 15 1.7 g | Intermediate 3 8.18 g | 7.6 | Intermediate 20 37.8 g |
| 97 | PVA200 0.6 g | Intermediate 2 59.0 g | 9.4 | Lauric acid 16.0 g |
| 98 | PAA150 0.8 g | Intermediate 2 59.0 g | 9.5 | Lauric acid 16.0 g |
| 99 | Intermediate 11 16.8 g | Intermediate 2 59.0 g | 10.2 | Lauric acid 16.0 g |
| 100 | Intermediate 12 17.0 g | Intermediate 2 59.0 g | 11.1 | Lauric acid 16.0 g |
| 101 | Intermediate 16 2.2 g | Intermediate 2 59.0 g | 9.1 | Lauric acid 16.0 g |
| 102 | Intermediate 17 1.8 g | Intermediate 2 59.0 g | 9.7 | Lauric acid 16.0 g |

TABLE 7

| Example | Acid number mgKOH/g | Amine number mgKOH/g | Appearance |
|---|---|---|---|
| 52 | 9.1 | 49.3 | Waxy solid |
| 53 | 4.5 | 8.5 | Clear liquid |
| 54 | 8.7 | 35.5 | Solid |
| 55 | 5.2 | 15.3 | Clear liquid |
| 56 | 8.5 | 34.5 | Waxy solid |
| 57 | 9.3 | 26.5 | Waxy solid |
| 58 | 5.6 | 5.5 | Clear liquid |
| 59 | 4.8 | 6.1 | Clear liquid |
| 60 | 5.7 | 4.2 | Clear liquid |
| 61 | 9.2 | 16.2 | Waxy solid |
| 62 | 5.2 | 2.4 | Clear liquid |
| 63 | 4.9 | 7.3 | Waxy solid |
| 64 | 4.6 | 8.0 | Waxy solid |
| 65 | 5.1 | 6.3 | Solid |
| 66 | 4.5 | 4.6 | Clear liquid |
| 67 | 10.1 | 8.4 | Waxy solid |
| 68 | 5.5 | 5.8 | Clear liquid |
| 69 | 5.2 | 3.6 | Clear liquid |
| 70 | 4.4 | 3.3 | Clear liquid |
| 71 | 4.7 | 4.9 | Clear liquid |
| 72 | 15.6 | 3.6 | Clear liquid |
| 73 | 6.0 | 3.8 | Clear liquid |
| 74 | 4.5 | 4.0 | Clear liquid |
| 75 | 9.8 | 11.5 | Solid |
| 76 | 6.0 | 3.5 | Viscous liquid |
| 77 | 5.5 | 3.3 | Viscous liquid |
| 78 | 4.5 | 5.8 | Clear liquid |
| 79 | 5.2 | 3.4 | Clear liquid |
| 80 | 4.9 | 3.3 | Clear liquid |
| 81 | 6.2 | 3.0 | Clear liquid |
| 82 | 5.3 | 2.9 | Clear liquid |
| 83 | 4.5 | 6.7 | Viscous liquid |
| 84 | 4.9 | 2.1 | Waxy solid |
| 85 | 10.5 | 60.6 | Solid |
| 86 | 6.0 | 22.7 | Clear liquid |
| 87 | 5.2 | 47.2 | Clear liquid |
| 88 | 4.5 | 18.5 | Clear liquid |
| 89 | 6.0 | 10.3 | Clear liquid |
| 90 | 5.3 | 15.2 | Viscous liquid |
| 91 | 6.2 | 12.2 | Waxy solid |
| 92 | 4.9 | 16.9 | Clear liquid |
| 93 | 8.3 | 10.2 | Viscous liquid |
| 94 | 11.3 | 48.7 | Waxy solid |
| 95 | 10.7 | 40.8 | Solid |
| 96 | 12.5 | 12.0 | Solid |
| 97 | 5.1 | 0.3 | Clear liquid |
| 98 | 4.7 | 0.2 | Clear liquid |
| 99 | 5.6 | 0.1 | Viscous liquid |
| 100 | 4.3 | 0.2 | Viscous liquid |
| 101 | 5.0 | 0.4 | Clear liquid |
| 102 | 4.8 | 0.3 | Clear liquid |

Performance Screening

In order to test the dispersion effect of the obtained samples, Resin Free Pigment Concentrates were prepared according to the Formulation 1. The mill base was dispersed in Scandex Shaker for 1.5 h with the help of glass beads. Afterwards the mill base was filtered and stored at room temperature overnight. Let-downs (Formulation 2) for testing were based on a stoving enamel, and a CAB base coat. Formulation 3 shows the paint formulations for the stoving enamel and CAB paints. The paint preparation was mixed under high speed stirring for 5 minutes at 2000 rpm, and applied on polyester film with a 35-75 μm film thickness. After preparing draw-downs, the rest of paints were diluted 1:1 with butyl acetate for a pour-out test.

First, the competitive grades were synthesized according to patents, e.g. WO 9421368, U.S. Pat. No. 5,700,395, U.S. Pat. No. 6,583,213, and U.S. Pat. No. 6,599,947 and so on. The performance of these grades was tested according to Formulations 1, 2, and 3. Results showed competitive product A performs better than the others, which was then taken as a representative dispersant in the text.

Formulations 1. Preparation of Pigment Concentrates

| | Pigment Concentrate No. | | | |
|---|---|---|---|---|
| Ingredients | 1 | 2 | 3 | 4 |
| 1) Dispersant (100% solid) | 5.35 | 6.00 | 3.62 | 3.25 |
| 2) 1-methoxy-2-propyl acetate (MPA) | 19.65 | 25.62 | 31.38 | 21.7 |
| 3) Pigment White 21 | 75.00 | | | |
| 4) Pigment Black 7 (Special Black 100) | | 20.00 | | |
| 5) Pigment Blue 15:2 | | | 15.00 | |
| 6) Pigment Red 254 | | | | 25.00 |
| 7) 3.0 mm glass beads | 100.0 | 100.0 | 100.0 | 100.0 |
| Total (g) | 200.0 | 150.0 | 150.0 | 150.0 |

Formulations 2. Let-Down Systems

| a) Stoving Enamel | VIALKYD ® AC 451 | 68.4 |
|---|---|---|
| | Maprenal MF 650 | 31.4 |
| | Ciba ®EFKA ®3030 | 0.2 |
| | Total | 100 |
| b) CAB base coat | CAB 531-1 | 11.2 |
| | Butyl acetate | 51.9 |
| | URACRON ® CR 226 XB | 32.1 |
| | Uramex MF 821 | 4.8 |
| | Total | 100.0 |

VIALKYD® AC 451 is an alkyd resin.
Maprenal MF 650: melamine resin, Degussa.
Ciba ®EFKA ®3030 is a modified polysiloxane solution slip and leveling agent.
CAB-531 cellulose acetate butyrate material commercially available from Eastman Chemical.
Uracron CR 226 XB. DSM Coating Resins Uracron CR, OH acrylic.
Uramex MF 821: DSM Coating Resins Uramex (amino).

VIALKYD® AC 451 is an alkyd resin,

Maprenal MF 650: melamine resin, Degussa,

Ciba®3030 is a modified polysiloxane solution slip and leveling agent,

CAB-531 cellulose acetate butyrate material commercially available from Eastman Chemical, Uracron CR 226 XB. DSM Coating Resins Uracron CR, OH acrylic, Uramex MF 821: DSM Coating Resins Uramex (amino).

Formulation 3. Cab and Stoving Enamel Paints

| Code | 1 | 2 | 3 |
|---|---|---|---|
| Let-down (formulation 2a or 2b) | 9.0 | 7.5 | 7.0 |
| PC white (No. 2 in Formulation 1) | — | 2.0 | 3.0 |
| PC color (No. 4-6 in Formulation 1) | 1.0 | 0.5 | — |
| Total/g | 10.0 | 10.0 | 10.0 |

The performance of examples 1-102 in Table 5 and 7 were tested according to Formulations 1, 2 and 3. It was observed, that the pigment concentrates flow well and their viscosities were comparable or lower than the competitive product A. The rheological behavior of the pigment concentrates was measured with a Thermo-Haake RheoStress 600 equipment under the CR mode. The initial viscosities ($\eta_0$) and dynamic viscosities ($\eta_t$) of the pigment concentrations are listed in Table 8. According to the viscosity curves, the Pigment White concentrates (PW 21) have a Newtonian flow, while the Pigment Black concentrates (Special Black-100) exhibit a pseudoplastic flow. The Pigment Blue concentrates (PB 15:2) have plastic flows and thixotropic properties, but could easily flow under a low shear stress (i, in Table 8). In general, some examples were taken as the representative dispersants, such as 16-19, 46, 50, 58, 69, 79, 88, 97, and so on.

TABLE 8

Rheological data of Pigment Concentrates

| | PW 21 | | Special Black 100 | | PB 15:2 | |
|---|---|---|---|---|---|---|
| Example | $\eta_0$ mPas | $\eta_t$ mPas | $\eta_0$ mPas | $\eta_t$ mPas | τ/Pa (at Yield point) | $\eta_t$ mPas |
| Competitive product A | 1000 | 360 | >1000 | 300 | 50 | 150 |
| 16 | 450 | 200 | 600 | 150 | 28 | 80 |
| 19 | 330 | 170 | 550 | 140 | 20 | 70 |
| 62 | 550 | 240 | 480 | 120 | 30 | 80 |
| 69 | 780 | 350 | 430 | 130 | 25 | 80 |
| 79 | 650 | 310 | 450 | 100 | 18 | 60 |
| 89 | 710 | 340 | 400 | 140 | 20 | 70 |

Competitive product A is prepared according to U.S. Pat. No. 6,583,213, Ex. 9.

In the stoving enamel paint, the CAB paint, the performance of the dispersants was generally very good with satisfactory results, e.g. high gloss (on average, above 80 at 20°), no seeding, no rub-out, good color strength, and less yellowing of the white pigment (Table 9). Especially, the dispersants provided the better dispersant effect for blue pigment compared with the competitive products, even in TPA paint system (Formulation 4) as listed in Table 10

TABLE 9

The Yellowness and Whiteness of draw downs.

| | Stoving | | CAB | |
|---|---|---|---|---|
| Example | Yellowness | Whiteness | Yellowness | Whiteness |
| Competitive product A | 2.5 | 80 | −0.8 | 88 |
| 16 | 1.45 | 84 | −0.69 | 86 |
| 18 | 1.50 | 85 | −0.74 | 88 |
| 58 | 0.56 | 89 | −0.59 | 88 |
| 62 | 0.69 | 86 | −0.65 | 90 |
| 72 | 0.54 | 87 | −0.60 | 88 |
| 88 | 0.60 | 88 | −0.68 | 89 |

Measured by X-rite MA 68II multi-angle spectrophotometer at 45° according to criterion ASTM E313.

Formulations 4. TPA Paint System

| TPA base coat | PARALOID™ B-66, thermoplastic acrylate, Rohm Haas | 40 |
| --- | --- | --- |
| | Xylene | 8.0 |
| | Toluene | 38 |
| | MPA | 13.5 |
| | Ciba ®EFKA ®3030 | 0.5 |
| | Total | 100.0 |

Ciba ®EFKA ®3030 is a modified polysiloxane solution slip and leveling agent

TABLE 10

The dispersion effect for Pigment Blue 15:2 in TPA paint system

| Example | Gloss of drawdown 20/60° | Seeding | Gloss of pour out 20/60° |
| --- | --- | --- | --- |
| Competitive product A | 60/80 | Many seeding | 42/77 |
| 16 | 81/88 | no seeding | 58/86 |
| 18 | 79/84 | few seeding | 54/84 |
| 58 | 81/86 | no seeding | 56/85 |
| 62 | 82/87 | no seeding | 59/86 |
| 72 | 80/84 | few seeding | 55/84 |
| 88 | 83/89 | no seeding | 60/88 |

In the solubility test, samples were dissolved in various solvents first with a concentration of 50% (w/w), and then keep for one month at 25° C. and −5° C., respectively. Obviously, the dispersants of this invention provided an improved solubility compared with competitive products (Table 11). It indicates that the invention samples are less crystallization, and their compatibility in various solvent systems is better than that of the competitive product A.

TABLE 11

Solubility of samples in various solvent (50%, w/w)

| | MPA | | n-butyl acetate | | 2-Butanone | | Xylene | |
| --- | --- | --- | --- | --- | --- | --- | --- | --- |
| Example | 25° C. | −5° C. | 25° C. | −5° C. | 25° C. | −5° C. | 25° C. | −5° C. |
| Product A | ✓x* | x* | ✓x | x | ✓ | ✓x | ✓ | ✓x |
| 17 | ✓* | ✓x | ✓ | ✓x | ✓ | ✓ | ✓ | ✓ |
| 18 | ✓ | ✓ | ✓ | ✓ | ✓ | ✓ | ✓ | ✓ |
| 58 | ✓ | ✓ | ✓ | ✓ | ✓ | ✓ | ✓ | ✓ |
| 72 | ✓ | ✓ | ✓ | ✓ | ✓ | ✓ | ✓ | ✓ |
| 83 | ✓ | ✓x | ✓ | ✓x | ✓ | ✓ | ✓ | ✓ |
| 88 | ✓ | ✓ | ✓ | ✓ | ✓ | ✓ | ✓ | ✓ |

*✓: solubility is good, and the solution is clear;
✓x: solubility is medium and partially crystallized;
x: solubility is poor and totally crystallized.

The invention claimed is:

1. A dispersant of formula I

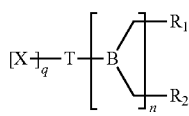

wherein
T is selected from polyethylene imine (PEI), modified PEI, polyvinylamine (PVA), modified PVA, polyallylamine (PAA) and modified PAA moieties, wherein the modified PEI, modified PVA, and modified PAA is a group of formula II or III PEI, PVA or PAA$-[-Y-]_m$  II or $[A-]_p$PEI, PVA or PAA  III, wherein Y is an extend monomer selected from a lactone, alkyl substituted lactone or a hydroxyl carboxylic acid, A is a side chain monomer selected from a monofunctional carboxylic acid containing 1-10 carbon atoms, m is a number of 1-40, p is a number of 1-1000, with the proviso that p is less than the sum of primary and secondary amine groups of the backbone PEI, PVA or PAA, B is 2.2-bis(hydroxymethyl)propionic acid or α,α-bis(hydroxymethyl) butyric acid, $R_1$ and $R_2$ are identical and are selected from lauric acid and stearic acid, X is B with —OH terminal group, $R_1$, or $R_2$, q is a number between 5-2000, with the proviso that q is less than the sum of all amine groups of PEI, PVA or PAA, n is a number of 1-6, wherein the dispersant of formula I is made by a "convergent" or "divergent" approach, wherein the "convergent" approach is characterized by reaction of B and $R_1$ or $R_2$, or B and X to produce an arm firstly, and then grafting this arm onto core molecule T in sequence, wherein the "divergent" approach is characterized by grafting B onto core molecule T firstly, then more and more B grafted onto the peripheral B of above obtained polymer layer by layer, finally, grafting $R_1$ and/or $R_2$ onto the above polymers.

2. The dispersant according to claim 1 wherein T is polyethylene imine or modified polyethylene imine.

3. The dispersant according to claim 1 wherein Y is ε-caprolactone or valerolactone.

4. A process for preparation of a polyamine-based dispersant of formula I

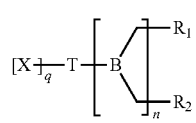

wherein
T is selected from polyethylene imine (PEI), modified PEI, polyvinylamine (PVA), modified PVA, polyallylamine (PAA) and modified PAA moieties, wherein the modified PEI, modified PVA, and modified PAA is a group of formula II or III PEI, PVA or PAA$-[-Y-]_m$  II or $[A-]_p$PEI, PVA or PAA  III, wherein Y is an extend monomer selected from a lactone, alkyl substituted lactone or a hydroxylcarboxylic acid, A is a side chain monomer selected from a monofunctional carboxylic acid containing 1-10 carbon atoms, m is a number of 1-40, p is a number of 1-1000, with the proviso that p is less than the sum of primary and secondary amine groups of the backbone PEI, PVA or PAA, B is 2.2-bis(hydroxymethyl)propionic acid or α,α-bis(hydroxymethyl) butyric acid, $R_1$ and $R_2$ are identical and are selected from lauric acid and stearic acid, X is B with —OH terminal group, $R_1$ or $R_2$ q is a number between 5-2000, with the proviso that q is less than the sum of all amine groups of PEI, PVA or PAA, n is a number of 1-6, by a "convergent" approach, characterized by reaction of B and $R_1$ or $R_2$, or B and X to produce an arm firstly, and then grafting this arm onto core molecule T in sequence.

5. The process according to claim 4 whereby the reaction temperatures range from 100° C. to 200° C. under $N_2$ atmosphere.

6. The process according to claim 5 wherein the products obtained have acid numbers of 5-25 mgKOH/g.

7. A process for preparation of a polyamine-based dispersant of formula I

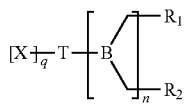

wherein

T is selected from polyethylene imine (PEI), modified PEI, polyvinylamine (PVA), modified PVA, polyallylamine (PAA) and modified PAA moieties, wherein the modified PEI, modified PVA, and modified PAA is a group of formula II or III PEI, PVA or PAA$-[-Y-]_m$  II or $[A-]_p$PEI, PVA or PAA  III, wherein Y is an extend monomer selected from a lactone, alkyl substituted lactone or a hydroxylcarboxylic acid, A is a side chain monomer selected from a monofunctional carboxylic acid containing 1-10 carbon atoms, m is a number of 1-40, p is a number of 1-1000, with the proviso that p is less than the sum of primary and secondary amine groups of the backbone PEI, PVA or PAA, B is a branched monomer selected from a monofunctional carboxylic acid moiety having at least two hydroxyl groups and a monofunctional carboxylic acid moiety having at least two hydroxyl groups wherein one or more of the hydroxyl groups are hydroxyalkyl substituted, $R_1$ and $R_2$ independently of one another are hydrophobic groups selected from a saturated or unsaturated fatty acid moiety with 3-24 carbon atoms, a monofunctional carboxylic acid moiety or a polymer moiety containing $C_3$-$C_{24}$ alkyl (hydroxyl)carboxylic acid moieties with MW ranges from 100 to 10,000 g/mol, X is B with —OH terminal group, $R_1$ or $R_2$ q is a number between 5-2000, with the proviso that q is less than the sum of all amine groups of PEI, PVA or PAA, n is a number of 1-6, by a "disvergent" approach, characterized by grafting B onto core molecule T firstly, then more and more B grafted onto the peripheral B of above obtained polymer layer by layer, finally, grafting $R_1$ and/or $R_2$ onto the above polymers.

8. The process according to claim 7 whereby the reaction temperatures range from 100° C. to 200° C., preferably 150° C. to 180° C. under $N_2$ atmosphere.

9. The process according to claim 8 wherein the products obtained have acid numbers of 5-25 mgKOH/g.

* * * * *